Patented Jan. 10, 1939

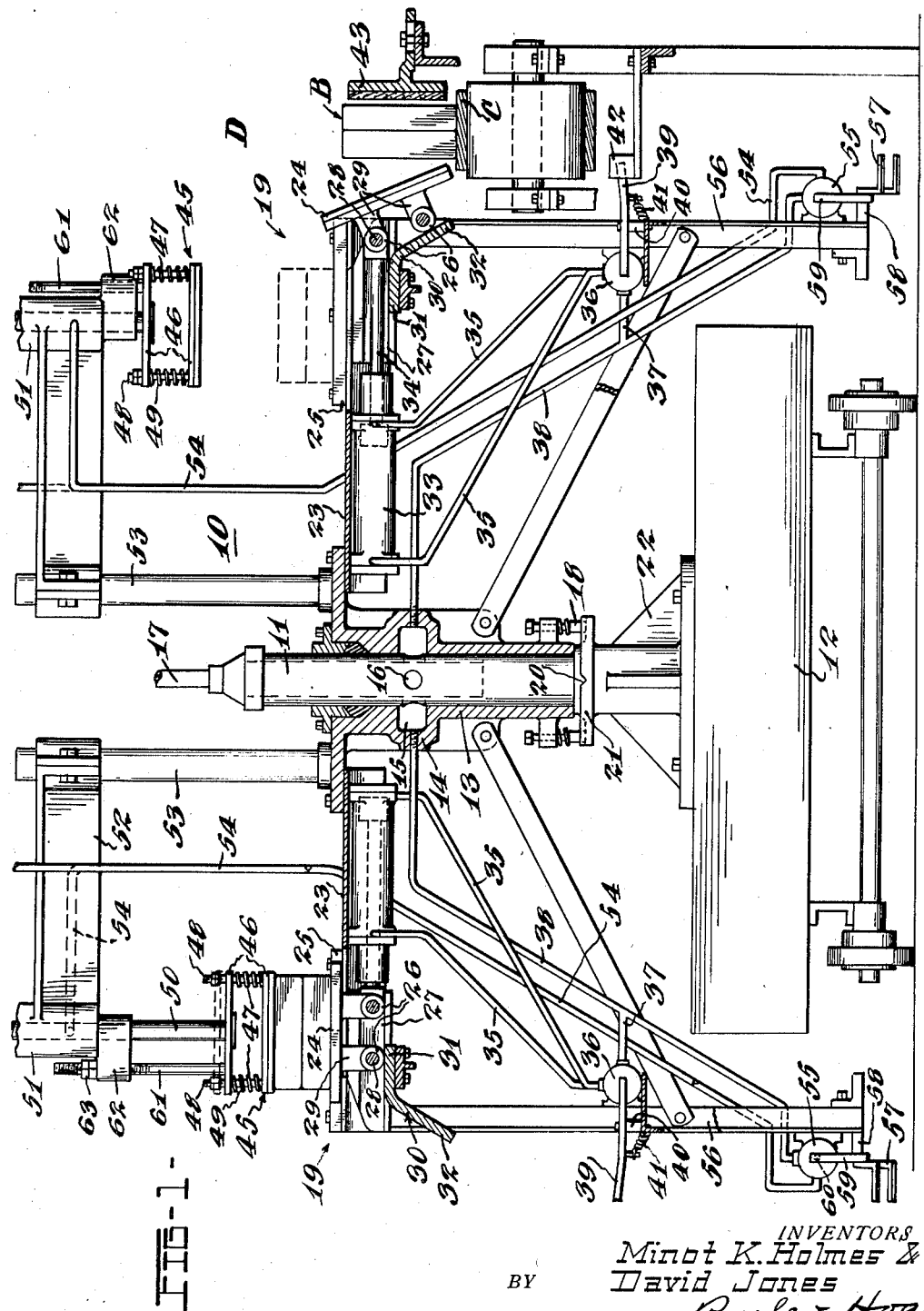

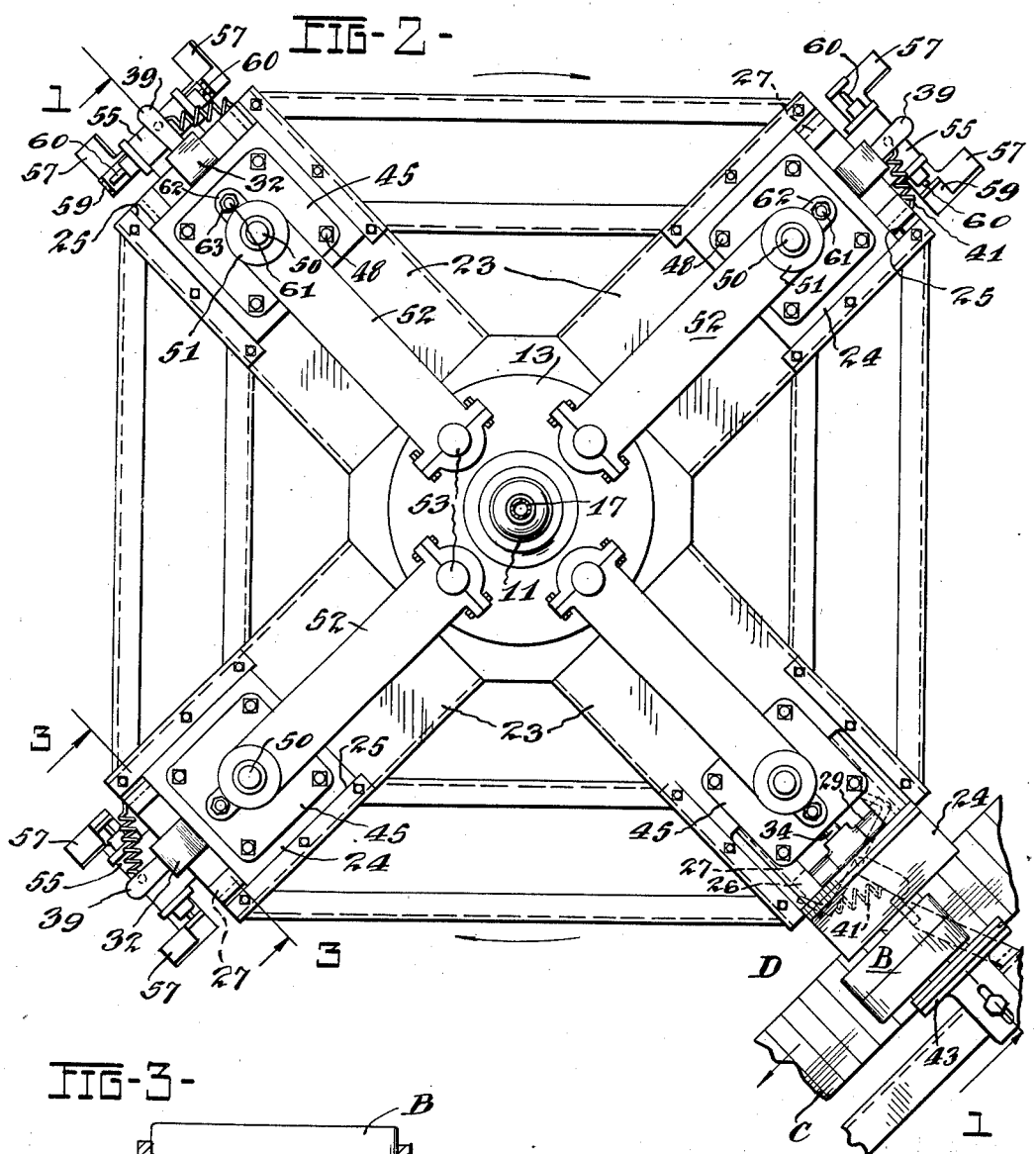

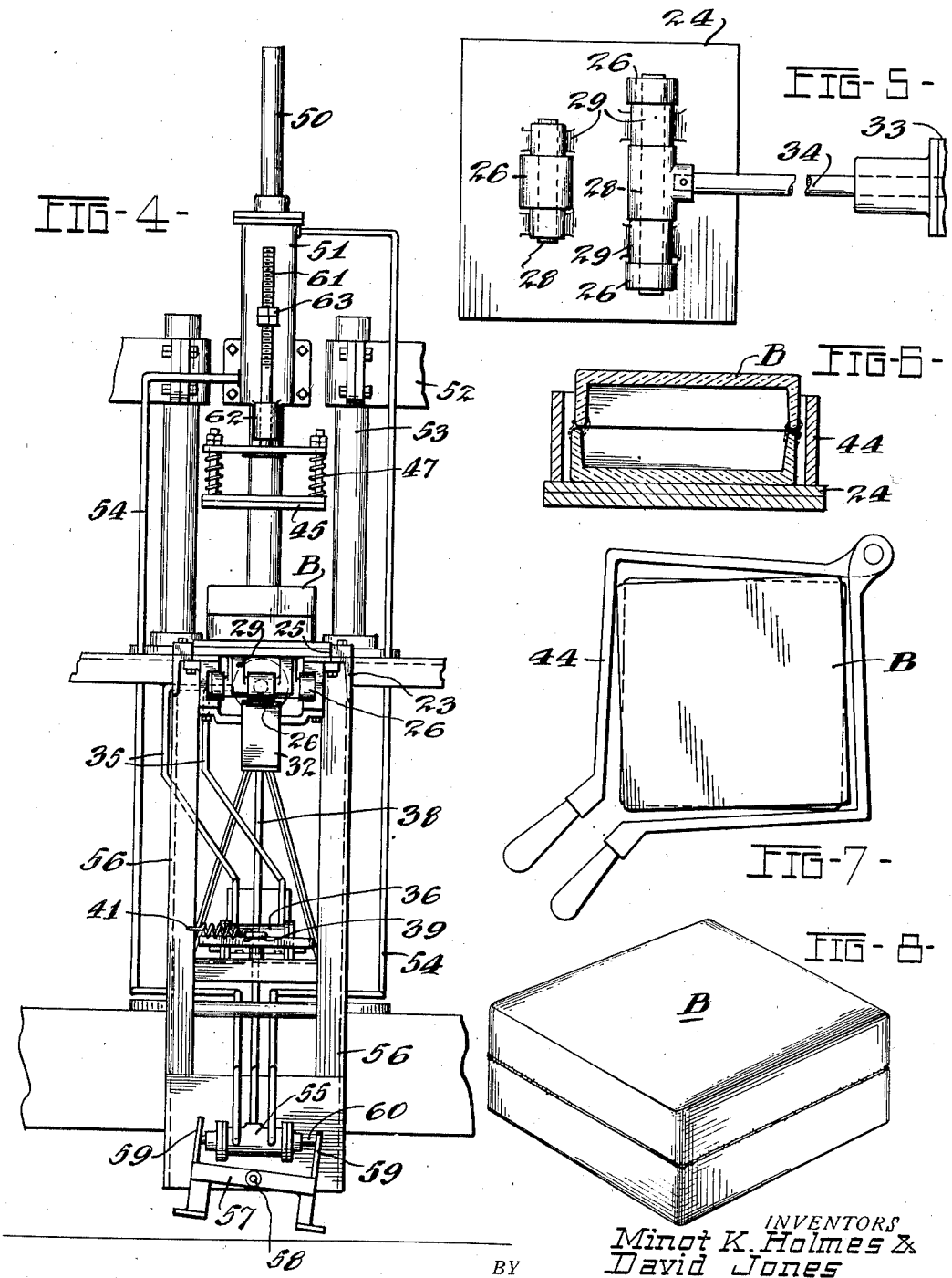

2,143,696

UNITED STATES PATENT OFFICE 2,143,696

APPARATUS FOR ASSEMBLING HOLLOW BUILDING BLOCKS

Minot K. Holmes and David Jones, Muncie, Ind., assignors to Owens-Illinois Glass Company, a corporation of Ohio Application April 19, 1937, Serial No. 137,664

10 Claims. (Cl. 49—37)

The present invention relates to apparatus for assembling hollow building blocks and more particularly to means for properly aligning or registering block sections and applying pressure to the assembled block during setting of a bonding medium which unites the sections.

The apparatus forming the subject matter of the present application is particularly adapted for use in assembling hollow glass building blocks made up of cup-like sections, certain edge portions of which are coated with a bonding medium and brought into contact with each other and so held during setting of the bonding medium. Such blocks are hermetically sealed and at least a partial vacuum is created therein due to cooling of the air incident to the natural drop in the temperature of the block during and following the annealing operation.

An object of the present invention is the provision of semi-automatic mechanical means for applying the necessary degree of pressure to assembled blocks during setting of the bonding medium and for automatically discharging completed blocks onto a conveyor or other means which transfers them to an annealing leer.

Another object is the provision of an apparatus of the above character in which the pressure applying devices include means for automatically gauging the transverse width of the blocks in a fashion to insure the maintenance of a standard uniform thickness thereof.

Other objects will be in part apparent and in part pointed out hereinafter.

In the drawings:

Fig. 1 is a vertical transverse sectional elevational view of an apparatus constructed in accordance with the present invention, this view being taken substantially along the line 1—1 of Fig. 2.

Fig. 2 is a top plan view of the apparatus.

Fig. 3 is a sectional elevational view taken substantially along the line 3—3 of Fig. 2.

Fig. 4 is a front elevational view of one of the pressing units.

Fig. 5 is a bottom plan view of one of the block holders or supports.

Fig. 6 is a vertical sectional view showing two block sections about to be properly aligned or registered prior to the final assembly operation.

Fig. 7 is a top plan view of the block sections shown in Fig. 6 together with a hand operated device which is employed in aligning the sections.

Fig. 8 is a perspective view of a completed block.

In the illustrated embodiment of our invention we employ a rotary carriage 10 mounted for rotation upon a hollow vertical central column 11, the latter rising from a wheeled base 12. The carriage 10 includes a hub 13 provided with a distributor 14 for air under pressure, said distributor consisting of an annular internal groove 15 or channel, which is at all times in register with a series of ports 16, the latter formed in the central column and providing constant communication between said channel 15 and interior of the column. Air under pressure is constantly supplied to this hollow column 11 by way of a pipe 17. The lower end of the hub carries spring pressed detents 18 corresponding in number to that of the pressing units 19 or heads, said detents being adapted to engage recesses 20 in a collar 21 which is carried by a pedestal 22 rising from said wheeled base 12. As will be apparent presently these detents 18 and recesses 20 cooperate to hold the pressing heads against accidental movement from their positions of rest, or stations.

Inasmuch as the several pressing heads 19 or units are identical in construction and operation, the following detail description will be directed to one head only.

Each head or unit consists of a horizontal radial arm 23 upon which a tiltable platform 24 is mounted, the latter being slidable radially of the arm between pressing and article discharging positions. The platform is mounted in slideways 25 and on its lower side carries rollers 26, two of which run in tracks 27. These rollers (Fig. 3) are mounted upon shafts 28 which are carried by brackets 29. The outermost roller 26 rides and rests upon a central track 30 which includes a horizontal inner section 31 and an inclined outer section 32, the former serving to support the outer end of the platform 24 in the pressing position and the latter operating to guide and control the tilting movement of the platform to the article discharging position.

Movement of the platform 24 between the pressing and discharging positions is obtained by means of a hydraulically operated piston motor 33 which is mounted upon the lower side of the radial arm 23. The piston rod 34 is pivoted to the innermost shaft 28. Operation of the piston motor is effected by introduction of air under pressure into the opposite ends of the cylinder in alternation by way of pipes 35 which lead to a conventional spool type reversing valve 36, the latter being connected by means of a short pipe 37 to a supply pipe 38 which in turn is connected to the distributor head 14. The valve 36 is operated by a lever 39 which is pivoted to a vertical hinge pin 40 and by means of a coil spring 41, is held in such position that air under pressure normally flows into the outer end of the motor 33 and thereby retains the platform in the pressing position. Upon arrival of one of the heads at the discharging station D (Fig. 1) the lever 39 engages an abutment 42 or trip which, during the interval of rest of the intermittently rotating carriage, reverses the valve 36 and permits flow of air under pressure into the inner end of the motor cylinder. Thus the platform 24 is tilted and the assembled block B is deposited upon a conveyor C by which it may be transferred to an annealing leer. A guard 43 is associated with the conveyor and operates to prevent the block from falling off of the conveyor immediately after it has been deposited thereon by tilting of the platform 24.

After the sections of the block B have been properly aligned by means of the implement 44 (Fig. 7) which aligning operation is effected while the halves are supported on the platform 24, a yielding presser head 45 is brought into engagement with the top surface of the block. It is understood that prior to such positioning of the block sections their meeting edges have been coated with a bonding medium which sets rather rapidly and unites the sections under pressure. The presser head may well consist of superposed plates 46 held spaced apart by yielding separators 47, the latter consisting of rods 48 and coil springs 49 encircling them between the plates 46. The upper plate is directly connected to the piston rod 50 of a vertical piston motor 51 which is mounted at the outer end of a bracket 52, the latter being mounted for vertical adjustment upon a boss 53 rising from the upper end of the hub 13. Air under pressure is introduced into the opposite ends of this vertical piston motor 51 in alternation through supply pipes 54 which are connected to a conventional spool type reversing valve 55 which is mounted upon the lower end of a vertical frame 56. Inasmuch as this valve 55 is intended to be foot operated, a treadle 57 is pivoted to a horizontal hinge pin 58 immediately beneath the valve, said treadle carrying upstanding fingers 59 which positively engage the opposite ends of the valve stem 60. Very obviously movement of the treadle to one position permits flow of air into one end of the cylinder for the purpose of raising the presser head 45 while the opposite positioning of the treadle results in lowering of the presser head into engagement with a block.

In order to control the extent of downward movement of each pressing head 45 and thereby to a considerable degree, regulate and predetermine the ultimate transverse thickness of the blocks, a limit rod 61 is arranged along side of each piston rod 50, one end of said limit rod being attached to the upper plate of the presser head while its other end extends through a guide 62. The upper end of this limit rod is threaded and carries a combined adjusting and stop nut 63 by means of which downward movement of the presser head may be regulably controlled.

In view of the foregoing it will be understood that operation of the machine involves simply the placing of superposed block sections upon one of the platforms 24 while the machine is stationary, properly aligning the block sections and then depressing one end of the treadle 57 so that the corresponding presser head 45 is lowered into engagement with the block. This pressure on the block is maintained until just prior to arrival at the discharging station D when an operator reverses the position of the treadle 57 and thereby removes the presser head from engagement with the block. Upon arrival at the discharging station D, the valve 36 is operated to cause outward movement and tilting of the platform 24 whereupon the block is discharged onto the conveyor C.

Modifications may be resorted to within the spirit and scope of the appended claims.

We claim:

1. Apparatus of the character described, comprising a rotatable annular series of normally horizontal tiltable platforms, presser heads individual to and arranged above the platforms, means for effecting relative vertical movement between the platforms and presser heads, radial slideways supporting the platforms, inclined tracks individual to the platforms for controlling tilting movement thereof, and piston motors individual and pivoted to the platforms for imparting radial movement thereto.

2. Apparatus of the character described, comprising a rotatable annular series of pressing units each including a normally horizontal tiltable platform, a piston motor for moving the platform radially between article pressing and discharging positions, an inclined track for controlling the tilting movement of the platform, a presser head arranged above the platform, and means for moving the presser head vertically relative to the platform.

3. Apparatus of the character described, comprising a rotatable annular series of pressing units each including a normally horizontal tiltable platform, means for moving the platform radially between pressing and article discharging positions, an inclined track for controlling the tilting movement of the platform, a presser head arranged above the platform, means for effecting relative vertical movement between the platform and presser head, and adjustable means for regulably controlling the extent of such relative movement.

4. Apparatus of the character described, comprising a rotatable annular series of pressing units each including a normally horizontal tiltable platform, a piston motor for moving the platform radially between pressing and article discharging positions, an inclined track for controlling the tilting movement of the platform, a presser head arranged above the platform, a vertical piston motor for moving the presser head relative to the platform, and valves for regulating the operation of said motors.

5. Apparatus of the character described, comprising a rotatable annular series of pressing units each including a normally horizontal tiltable platform, a piston motor for moving the platform radially between pressing and article discharging positions, an inclined track for controlling the tilting movement of the platform, a presser head arranged above the platform, a vertical piston motor for moving the presser head relative to the platform, an automatic valve for controlling operation of the piston motor associated with the tiltable platform and a manually controlled valve for regulating operation of the other motor.

6. Apparatus of the character described, comprising a rotatable annular series of pressing units each including a normally horizontal tiltable platform, a piston motor for moving the platform radially between pressing and article discharging positions, an inclined track for controlling the tilting movement of the platform, a presser head arranged above the platform, a vertical piston motor for moving the presser head relative to the platform, valves for regulating the operation of said motors, and adjustable means for limiting the extent of movement of the presser head in one direction.

7. Apparatus of the character described, comprising a rotatable annular series of pressing units, each including a normally horizontal tiltable platform, means for moving the platform radially between pressing and article-discharging positions, an inclined track for controlling the tilting movement of the platform, a presser head arranged above the platform, means for moving the presser head toward the platform, and adjustable means for regulably controlling the extent of such movement.

8. Apparatus of the character described, comprising a rotatable annular series of pressing units, each including a normally horizontal tiltable platform, means for moving the platform radially between article pressing and discharging positions, an inclined track for controlling the tilting movement of the platform, a presser head arranged above the platform, and means for moving the presser head vertically relative to the platform.

9. Apparatus of the character described, comprising a rotatable annular series of pressing units, each including a normally horizontal tiltable platform, means for moving the platform radially between pressing and article-discharging positions, means imparting a degree of unstable equilibrium to the platform to tilt the same when the same is moved radially outwardly, a presser head arranged above the platform, and means for moving the presser head vertically relative to the platform.

10. Apparatus of the character described, comprising a rotatable annular series of pressing units each including a normally horizontal tiltable platform, means for moving the platform radially between pressing and article-discharging positions, means for guiding said platform to a tilted position when the same is moved radially outwardly, a presser head arranged above the platform, and means for moving the presser head vertically relative to the platform.

MINOT K. HOLMES.
DAVID JONES.